(12) United States Patent
Charlet et al.

(10) Patent No.: US 11,048,672 B2
(45) Date of Patent: Jun. 29, 2021

(54) BINARY LARGE OBJECT PLATFORM FOR INTERACTIVELY ANALYZING AND EDITING STRUCTURAL METADATA

(71) Applicant: International Business Machines Corporation, Armonk, NY (US)

(72) Inventors: Kyle J. Charlet, Morgan Hill, CA (US); Nathan D. Church, San Jose, CA (US); Kevin D. Hite, Morgan Hill, CA (US); Richard V. Tran, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 264 days.

(21) Appl. No.: 16/143,690

(22) Filed: Sep. 27, 2018

(65) Prior Publication Data

US 2020/0104386 A1    Apr. 2, 2020

(51) Int. Cl.
| | |
|---|---|
| *G06F 7/02* | (2006.01) |
| *G06F 16/00* | (2019.01) |
| *G06F 16/21* | (2019.01) |
| *G06F 11/07* | (2006.01) |
| *G06F 9/54* | (2006.01) |
| *G06F 16/28* | (2019.01) |
| *G06F 16/22* | (2019.01) |
| *G06F 16/51* | (2019.01) |
| *G06F 16/71* | (2019.01) |

(52) U.S. Cl.
CPC .............. *G06F 16/21* (2019.01); *G06F 9/542* (2013.01); *G06F 11/0718* (2013.01); *G06F 11/0763* (2013.01); *G06F 16/2219* (2019.01); *G06F 16/289* (2019.01); *G06F 16/51* (2019.01); *G06F 16/71* (2019.01)

(58) Field of Classification Search
CPC ........ G06F 16/21; G06F 16/25; G06F 16/258; G06F 16/289; G06F 16/2219; G06F 16/51; G06F 16/71; G06F 9/542; G06F 11/0718; G06F 11/0763
See application file for complete search history.

(56) References Cited

U.S. PATENT DOCUMENTS

| | | |
|---|---|---|
| 6,769,095 B1 | 7/2004 | Brassard et al. |
| 7,272,819 B2 | 9/2007 | Seto et al. |

(Continued)

*Primary Examiner* — Bruce M Moser
(74) *Attorney, Agent, or Firm* — Cantor Colburn LLP; Teddi Maranzano

(57) ABSTRACT

Embodiments include methods, systems and computer program products method for editing and correcting structural metadata associated a binary large object (BLOB). The computer-implemented method includes obtaining, using a processor, at least a portion of structural metadata associated with the BLOB. The processor converts one or more fields associated with the at least a portion of structural metadata and determines that the one or more fields generated one or more errors or null values. The processor provides an interface, wherein the interface is used to cause a first movement or edit the one or more fields. The processor determines that the first movement or edit of the one or more fields fixes the one or more errors or null values and provides an indication that the first movement or edit of the one or more fields has or has not fixed the one or more errors or null values.

12 Claims, 7 Drawing Sheets

(56) References Cited

U.S. PATENT DOCUMENTS

| | | |
|---|---|---|
| 8,832,081 B2 | 9/2014 | Charlet et al. |
| 8,959,489 B2 | 2/2015 | Gasperini et al. |
| 9,058,407 B2 * | 6/2015 | Guo ........................ G06F 16/86 |
| 2004/0237027 A1 | 11/2004 | Wakita et al. |
| 2013/0018881 A1 * | 1/2013 | Bhatt ...................... G06F 16/29 |
| | | 707/736 |

* cited by examiner

| Policy Type | Property Type | Number of Rooms | Home Value | Address | Make | Model | Year | Color | Value |
|---|---|---|---|---|---|---|---|---|---|
| M | | | | | Fort | T | 1956 | Black | 15000.00 |
| H | Single Family | 7 | 500,000.00 | 555 Disk Drive, San Jose, CA 95141 | | | | | |

BINARY LARGE OBJECT PLATFORM FOR INTERACTIVELY ANALYZING AND EDITING STRUCTURAL METADATA

BACKGROUND

The present invention relates in general to database management and more specifically, to analyzing and editing a binary large object (BLOB) within a Database Management System (DBMS).

DBMS software often uses a database query language to store and retrieve data in a database. The database query language can be a Structured Query Language (SQL) interface. A database is organized into tables that consist of rows and columns of data. The rows may be called tuples, records, or rows.

A BLOB is a collection of binary data stored as a single entity in the DBMS. In the DBMS and database Application Programming Interfaces (APIs), the interpretation BLOB data is left to a database application responsible for retrieving the BLOB data. Database applications retrieve raw BLOB data from the database and use application logic to post-process the BLOB data.

SUMMARY

Embodiments of the invention are directed to a method for editing and correcting structural metadata associated a binary large object (BLOB). A non-limiting example of the computer-implemented method includes obtaining, using a processor, at least a portion of structural metadata associated with the BLOB. The processor converts one or more fields associated with the at least a portion of structural metadata. The processor determines that the one or more fields generated one or more errors or null values. The processor further provides an interface, wherein the interface is used to cause a first movement or edit of the one or more fields. The processor further determines that the first movement or edit of the one or more fields fixes the one or more errors or null values. The processor further provides an indication that the first movement or edit of the one or more fields has or has not fixed the one or more errors or null values.

Embodiments of the invention are directed to a computer program product that can include a storage medium readable by a processing circuit that can store instructions for execution by the processing circuit for performing a method for editing and correcting structural metadata associated a binary large object (BLOB). The method includes obtaining at least a portion of structural metadata associated with the BLOB. The processor converts one or more fields associated with the at least a portion of structural metadata. The processor determines that the one or more fields generated one or more errors or null values. The processor further provides an interface, wherein the interface is used to cause a first movement or edit of the one or more fields. The processor further determines that the first movement or edit of the one or more fields fixes the one or more errors or null values. The processor further provides an indication that the first movement or edit of the one or more fields has or has not fixed the one or more errors or null values via the interface.

Embodiments of the invention are directed to a system. The system can include a processor in communication with one or more types of memory. The processor can be configured to obtain at least a portion of structural metadata associated with a binary large object (BLOB). The processor can be configured to convert one or more fields associated with the at least a portion of structural metadata. The processor can be configured to determine that the one or more fields generated one or more errors or null values. The processor can be configured to provide an interface, wherein the interface is used to cause a first movement or edit the one or more fields. The processor can be configured to determine that the first movement or edit of the one or more fields fixes the one or more errors or null values. The processor can be configured to provide an indication that the first movement or edit of the one or more fields has or has not fixed the one or more errors or null values via the interface.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The foregoing and other features, and advantages of the disclosure are apparent from the following detailed description taken in conjunction with the accompanying drawings in which:

FIG. 5 illustrates a diagram of an exemplary insurance policy result set of a portion of underlying raw BLOB data in a viewable format according to one or more embodiments of the present invention;

Figure 1:
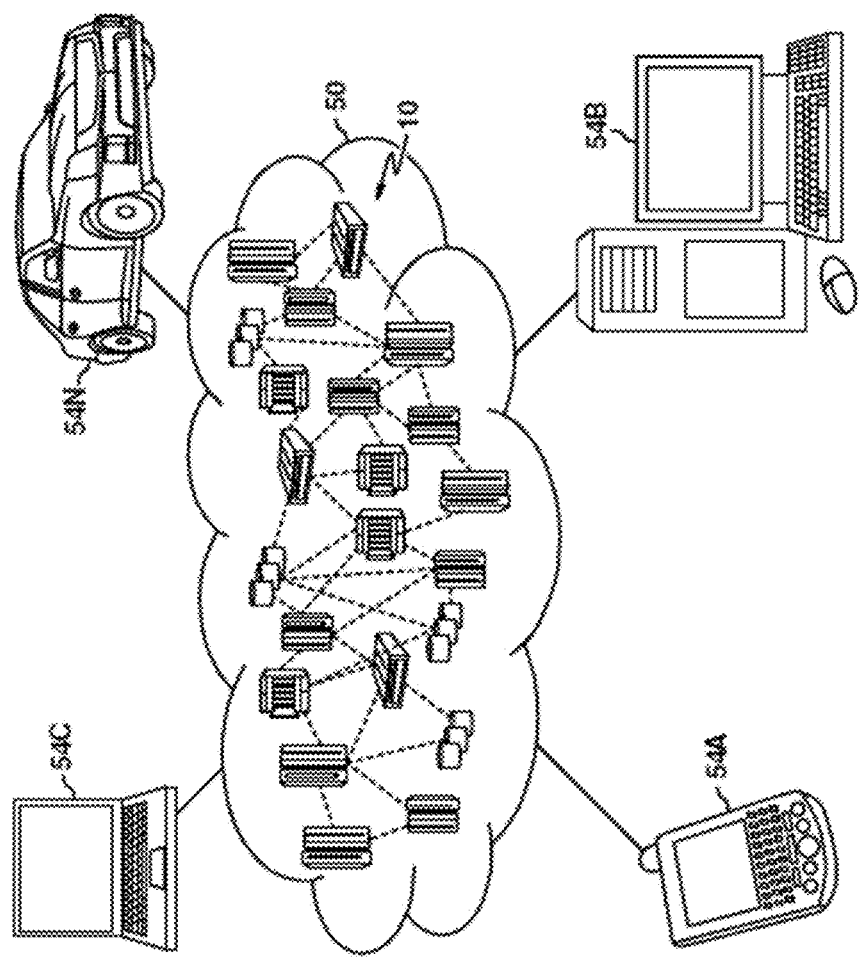
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to DBMS, databases and data structures. Data structures can be very complex. Software systems often require structural metadata to produce human readable data values from a Binary Large Object (BLOB) or to obtain BLOB data from human provided values. The structural metadata contains information regarding the breakdown of a BLOB into a structured collection of field definitions. A field definition contains the location, size, and data type information for the BLOB, which enables conversion software to locate and convert BLOB data to a human readable value for a given field associated with the BLOB.

Conversions of BLOB mappings or re-mappings based on a value of a control field within the BLOB are typically able to produce human readable values as needed because the metadata and field data have been input correctly (i.e., no input errors) and have been mapped to a proper location. However, errors (e.g., incorrect structural metadata or an incorrect overlay of the BLOB to the metadata (location)) or data corruption can be introduced to the value the control field by a user when creating or importing data structure information into the structural metadata. Accordingly, when attempting to convert the bytes from the BLOB using field metadata associated with a particular location in the BLOB, one or more data structures could be rendered unsuitable for processing and/or viewing, and all the fields contained in the one or more data structures would display a value of null or an error. Accordingly, only the fields in the data structure defined as suitable for the given control field value would have converted values displayed. Currently, correcting these errors or replacing the corrupt data is time-consuming and inefficient because current solutions typically involve calling or instant messaging a number of different people to determine if anyone has the requisite skills to address to correct the errors or replace the corrupt data until assistance can be found.

Turning now to an overview of the aspects of the invention, one or more embodiments of the invention address the above-described shortcomings of the prior art by providing an interface that allows a user to represent all or a portion of structural metadata. The user can interactively move the structural metadata to any location within a BLOB, as well as automatically convert bytes for each field associated with the BLOB to a human readable value for display to the user. In addition, the interface provides the user with an ability to edit (add, remove, move, etc.) the structural metadata in the context of a location within a BLOB, which can be used to materialize structural metadata for use by a software system to produce a human readable output. Accordingly, troubleshooting and correction of structural metadata or BLOB is possible using the interface to edit the structural metadata (e.g. shifting one or more fields in the structural metadata by an increment of one or more bytes within the BLOB) until output associated with the BLOB is satisfactory.

The above-described aspects of the invention address the shortcomings of the prior art by providing an interface that allows a user to inspect field values at a specific location within a BLOB to determine if errors have occurred and graphically visualize and edit each field within the data structure and immediately see the effects of edits on the fields modified.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer/server 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
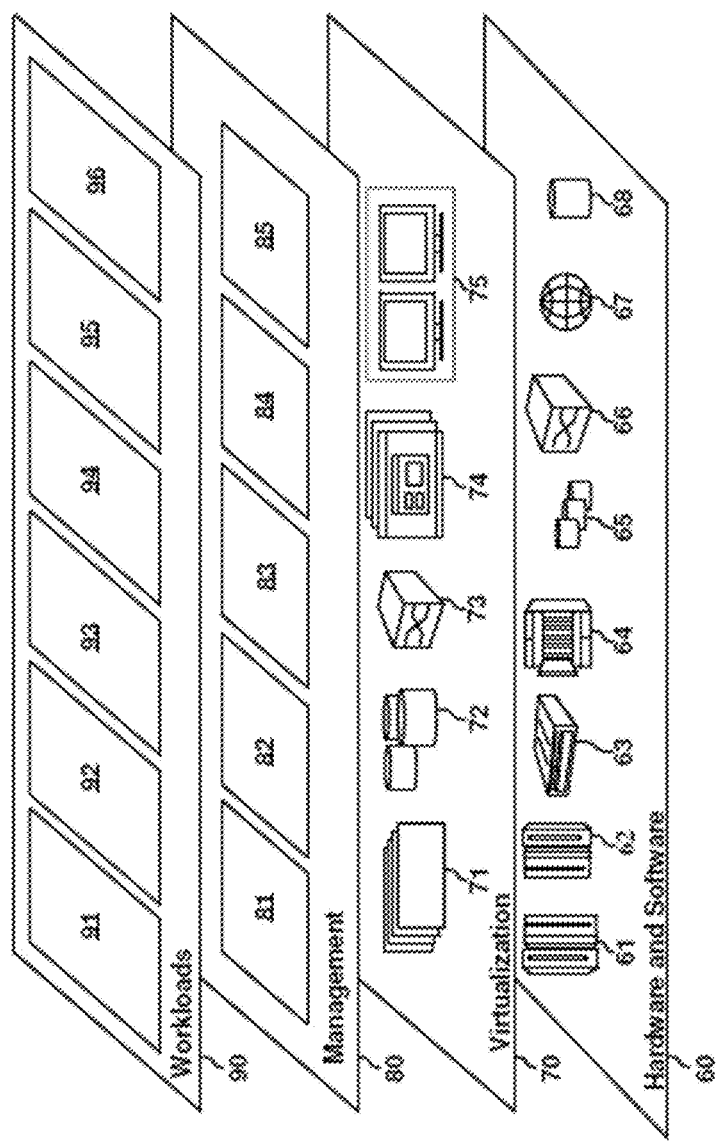
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions that may be provided from this layer include: mapping and navigation 91; software development and lifecycle management 92; virtual classroom education delivery 93; data analytics processing 94; transaction processing 95; and database management interface 96.

Figure 3:
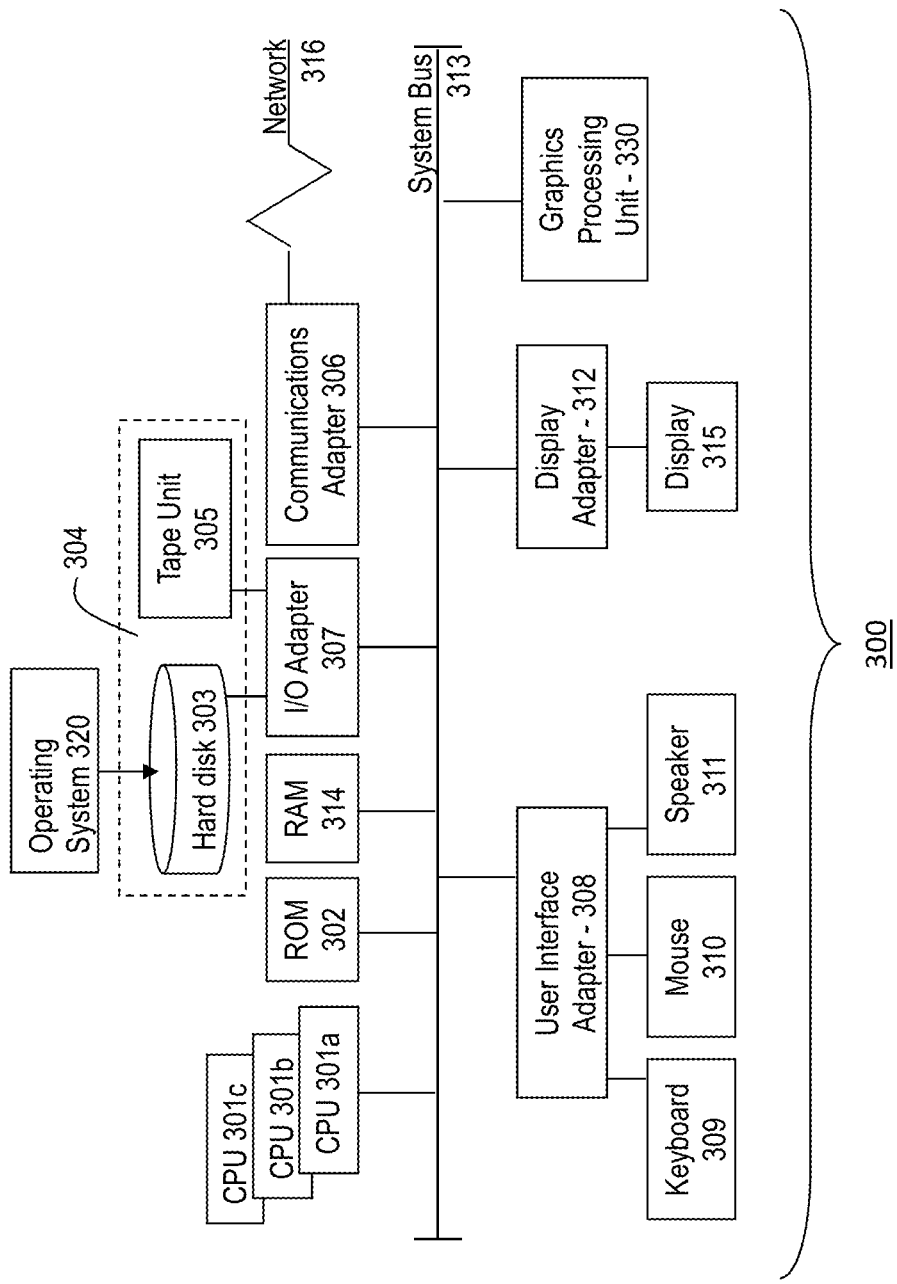
FIG. 3 is a block diagram illustrating one example of a processing system for practice of the teachings herein.

Referring to FIG. 3, there is shown a processing system 300 for implementing the teachings of the present disclosure according to one or more embodiments of the invention described herein. The system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a communications adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 may be stored in mass storage 304. A communications adapter 306 interconnects bus 313 with an outside network 316 enabling data processing system 300 to communicate with other such systems. A screen (e.g., a display monitor) 315 is connected to system bus 313 by display adapter 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all interconnect to bus 313 via user interface adapter 308, which may include, for example, a Super I/O chip integrating multiple device adapters into a single integrated circuit.

In exemplary embodiments of the invention, the processing system 300 includes a graphics-processing unit 330. Graphics processing unit 330 is a specialized electronic circuit designed to manipulate and alter memory to accelerate the creation of images in a frame buffer intended for output to a display. In general, graphics-processing unit 330 is very efficient at manipulating computer graphics and image processing, and has a highly parallel structure that makes it more effective than general-purpose CPUs for algorithms where processing of large blocks of data is done in parallel.

Thus, as configured in FIG. 3, the processing system 300 includes processing capability in the form of processors 301, storage capability including system memory 314 and mass storage 304, input means such as keyboard 309 and mouse 310, and output capability including speaker 311 and display 315. In one embodiment, a portion of system memory 314 and mass storage 304 collectively store an operating system such as the AIX® operating system from IBM Corporation to coordinate the functions of the various components shown in FIG. 3.

Figure 4:
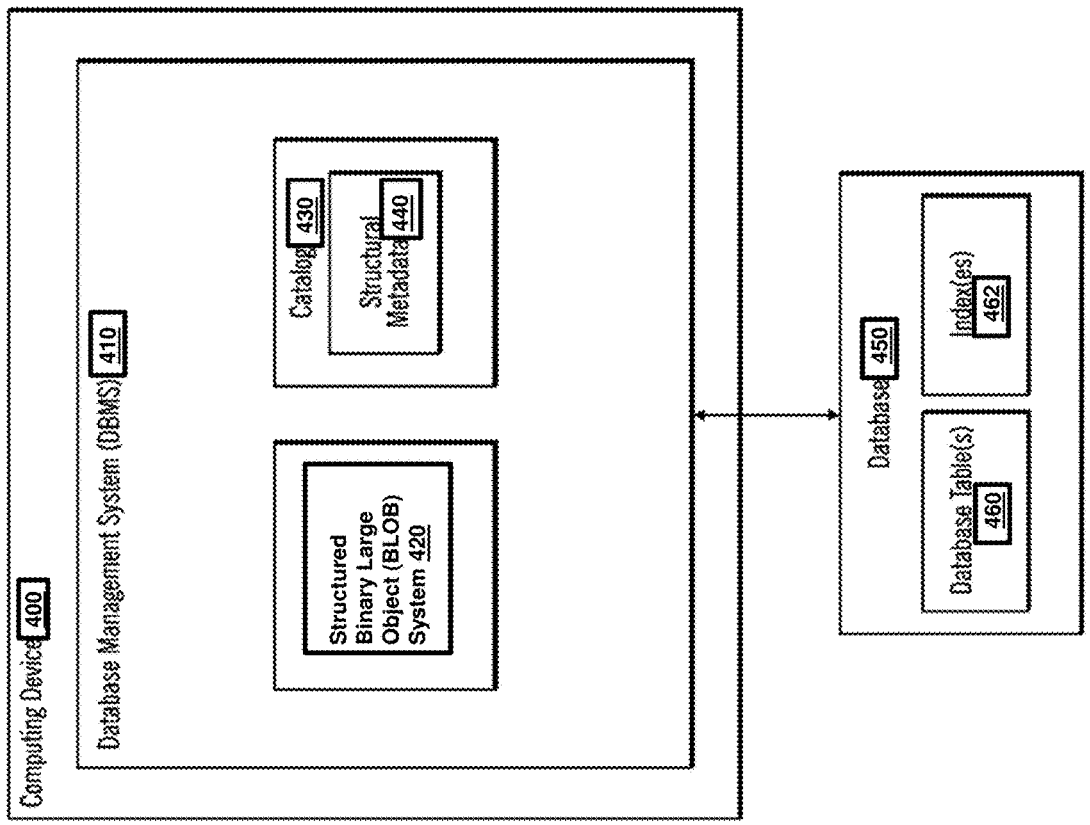
FIG. 4 is a block diagram illustrating a computing system according to one or more embodiments of the present invention.

Referring now to FIG. 4, there is illustrated a block diagram of a computing system 400 in accordance with one or more embodiments of the invention. As illustrated, the computing system 400 can include a database management system (DBMS) 410 which includes a structured a Binary Large Object (BLOB) system 420 and a catalog 430. The catalog 430 includes structural metadata 440. In certain embodiments, the structural metadata 440 includes offsets and lengths of structured content (e.g., fields) in the BLOB data, as well as, mapping information for use in accessing the BLOB data. The DBMS 410 is coupled to a database 450. The database 450 stores one or more database tables 460 and one or more indexes 462. The one or more database tables 460 may store BLOB.

The structured BLOB system 420 stores structural metadata 440 describing each of the structures associated with the BLOB data to assist in processing the BLOB data. The structural metadata 440 describes a mapping between BLOB data and a particular structure to enable mapping the BLOB data to the columns for that particular structure.

In addition to storing structural metadata 440 about the structures for the BLOB data, the structured BLOB system 420 stores, for each row inserted into the database 450, control data (e.g., a control flag or a control field). This control data may be stored directly in the BLOB data or as a separate column outside of the BLOB data. The structured BLOB system 420 can use the structural metadata 440 to map the BLOB data to a particular structure based on the control data.

The combination of structural metadata 440 and control data allows the structured BLOB system 420 to provide end users with structured BLOB data. In certain embodiments, the structured BLOB system 420 generates a result set having columns of the format of each type of BLOB data that may be included in the result set. In certain embodiments, the structured BLOB system 420 uses the value of the control data to determine which columns in the result set may have data and which may not for each row.

FIG. 5 depicts a diagram of an exemplary insurance policy result set 500 of a portion of underlying raw BLOB data in a viewable format in accordance with one or more embodiments of the invention. The structured BLOB system 420 can include additional column information, for example, policy type, property type, number of rooms, home value, address, make, model, year, color, and value. The result set 500 can contain one row of motor vehicle insurance policy data and one row of homeowners insurance policy data. When the BLOB data contains control data (i.e., policy type) of value "M", the structured BLOB system 420 presents the column data for the motor vehicle insurance policy based on the structural metadata 440 stored in the DBMS 410, which includes: policy type, make, model, year, color, and value.

Likewise, when the BLOB data has control data of value "H", the structured BLOB system 420 presents the column data for the homeowners insurance policy based on the structural metadata 440 stored in the DBMS 410, which includes: policy type, property type, number of rooms, home value, and address.

When the structured BLOB system 420 presents the values for one type of BLOB data in a row of the result set, the structured BLOB system 420 fills in the values for the columns specific to that type of BLOB data. The structured BLOB system 420 also presents the columns specific to other types of BLOB data as null or not valid (i.e., an error) for the current row of data.

Figure 6:
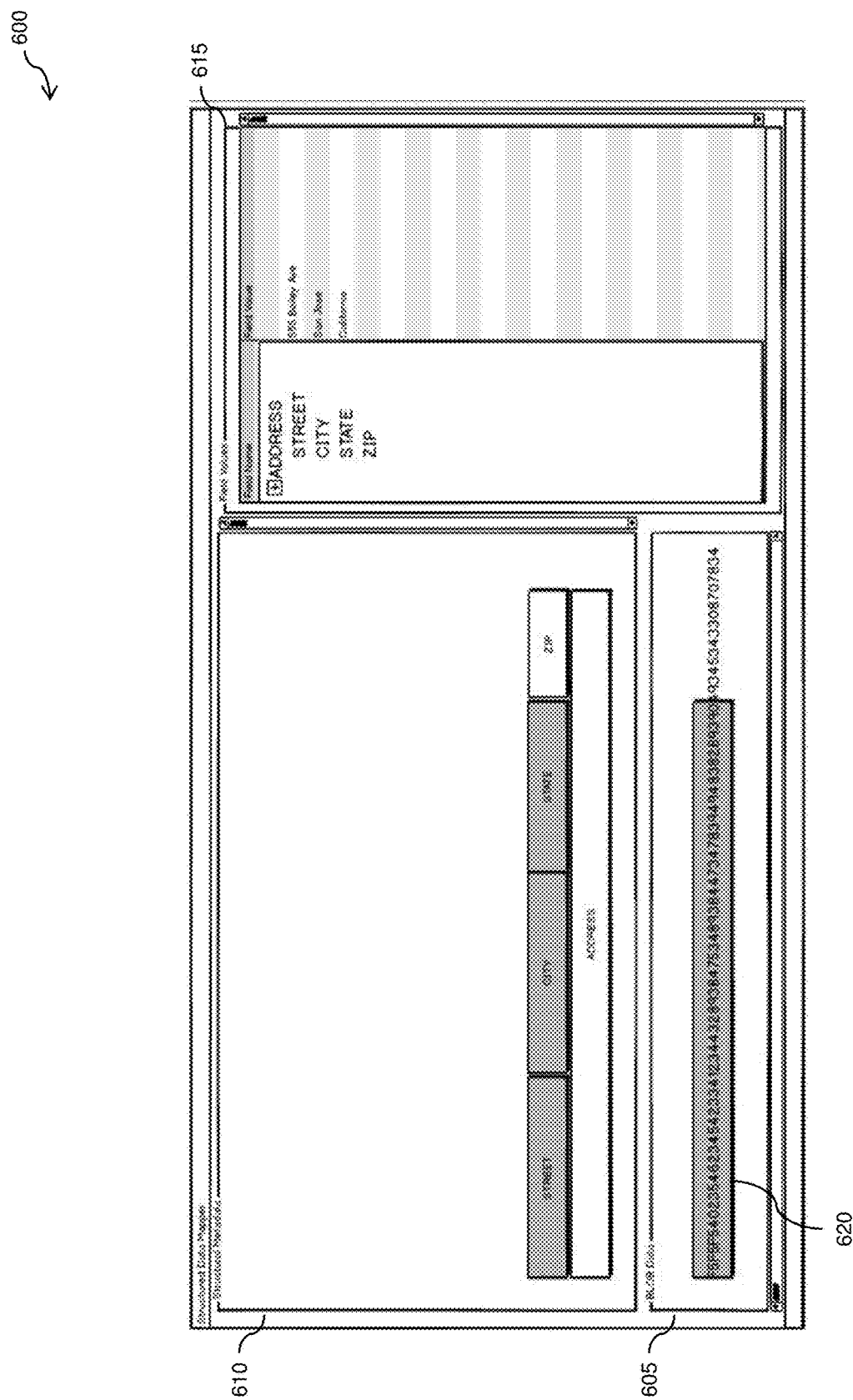
FIG. 6 depicts an exemplary interface for moving, materializing, editing, and testing portions of structural metadata according to one or more embodiments of the present invention.

FIG. 6 depicts an exemplary interface 600 for moving, materializing, editing, and testing portions of structural metadata in accordance with one or more embodiments of the invention. The interface 600, which can be a graphical user interface (GUI), can be used to interact with computing system 400 and can include a plurality of panels/sections. An editor panel 605 can contain an area for editing BLOB data, which can display a hexadecimal representation of bytes of the BLOB data. Panel 610 can provide an interactive graphical representation of the structural metadata to the user. Field values panel 615 can include field values, which can be used to display human readable values for fields of a data structure.

The editor panel 605 can display each field as a rectangle 620 spanning a desired portion of BLOB data. In order to visualize a hierarchy associated with the data structure, the editor panel 605 can also display child fields of the data structure as rectangles laid on top of the rectangle of an associated parent field in an order dictated by the data structure (not shown). The hierarchy of fields can include multiple layers of field rectangles. Accordingly, the editor panel 605 can be scrollable thereby allowing a user to traverse the multiple layers of the hierarchy. In addition, the editor panel 605 can be scrollable allowing a user to also scroll horizontally to show a full byte range of the BLOB data.

New fields can be added by way of actions taken in the Field values panel 615 (e.g. right click add new field under or after the currently selected field), which would result in a new rectangle being added to a corresponding location in panel 610. Editor panel 605 can show groups of bytes highlighted by rectangles 620 that correspond to one or more contiguous fields being selected in panel 610, which can also denote a subset of fields for which converted values can be displayed in Field values panel 615. One or more fields can be selected in 610, which will cause a corresponding highlight rectangle 620 to appear in panel 605. The user can drag the rectangle 620 left or right across the BLOB to change values displayed in the Field values panel 615. If no rectangles 620 are selected in panel 610, then no bytes will be highlighted in the editor panel 605, and all converted field values can be shown in the Field values panel 615.

In the Field values panel 615, fields can be added or edited. Rows or BLOBs of raw data can be added into editor panel 605. The editor panel 605 can display and enable editing of the raw BLOB data. For example, editing can occur for a single row or BLOB at a time. The editor panel 605 can include a simple context menu that allows switching between BLOBs. If the user finds the new/different location satisfactory, the user can save the changes thereby causing the associated underlying data structure metadata to record the new location of the relocated/corrected fields.

Accordingly, a user can use interface 600 to analyze and test the BLOB and associated structural metadata. The analysis and test can be used to determine whether null values exist in fields or fields have been marked with an error annotation. The error annotation can be due to a failure occurring when the computing system 400 attempts to convert the bytes at a given location in the BLOB using the structural metadata for an associated field. In response to encountering null values and error annotations, the interface 600 provides the user an ability to select and move one or more fields in the BLOB to different positions within the BLOB to determine whether changing the location of the one or more fields resolves the unexpected null values or conversion errors.

Figure 7:
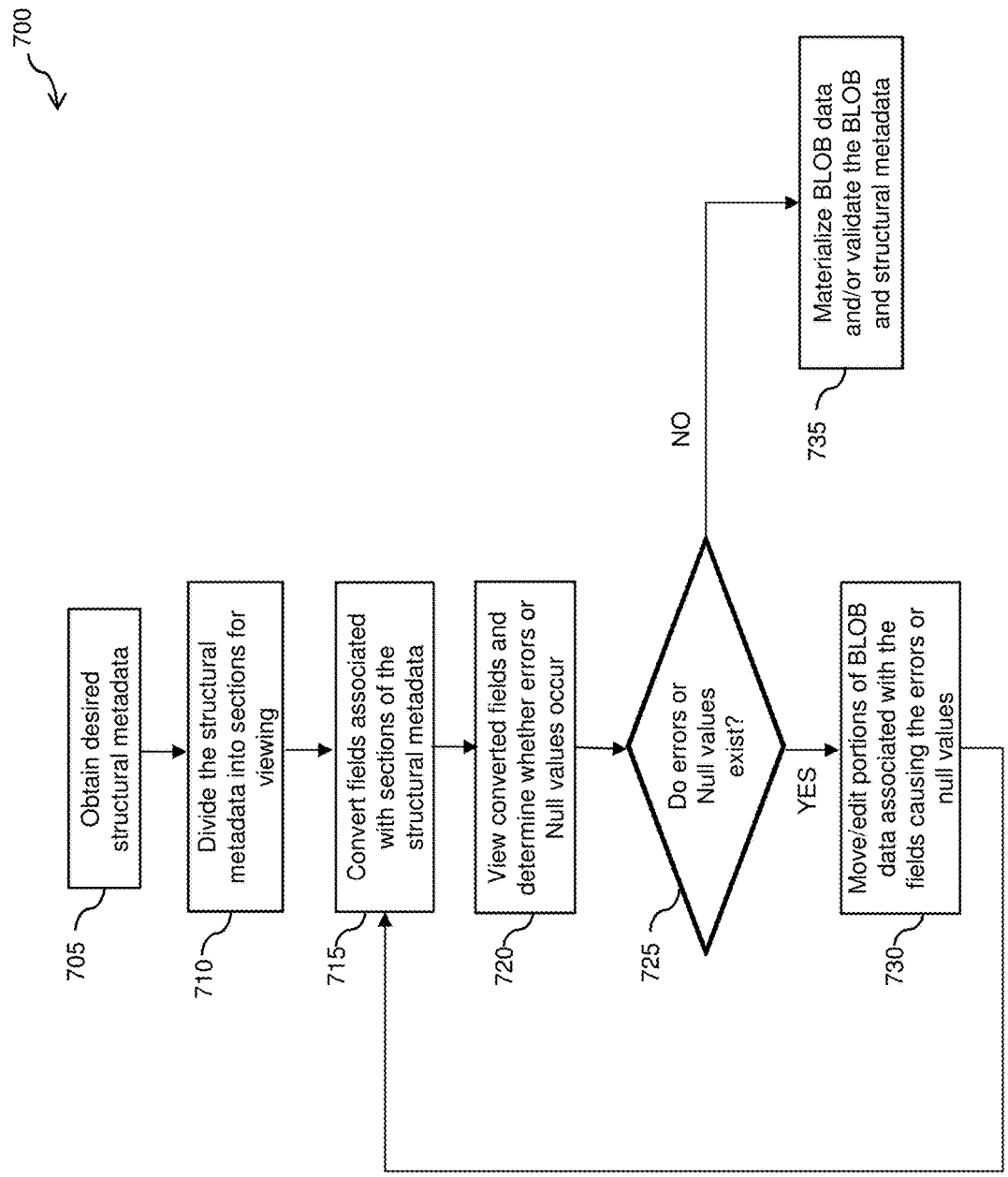
FIG. 7 illustrates a flow diagram of a method for editing and correcting structural metadata associated a BLOB according to one or more embodiments of the present invention.

Now referring to FIG. 7, a flow diagram of a method 700 for editing and correcting structural metadata associated with a BLOB in accordance with one or more embodiments of the present invention is illustrated. At block 705, a user can use a computing device, (e.g., desktop computer/server 54B, laptop computer 54C) to obtain structural metadata desired to be reviewed/tested. At block 710, the computing device can divide the structural metadata into sections for viewing. For example, the divisions can be related to the structural metadata or portions thereof, field values associated with the structural metadata and BLOB data associated with the structural metadata.

At block 715, the computing device can convert field values associated with the structural metadata to human readable values for verification of accuracy by the user. At block 720, the computing device can provide the output of the converted field values to the user for viewing via a display having a GUI. The GUI can also display an interactive graphical representation of the structural metadata, as well as a representation of bytes for the BLOB.

At block 725, the computing device can determine whether any errors or null values have been generated in response to the conversion of the field values. If no errors or null values were generated, the method proceeds to block 735, where the computing device can materialize the BLOB data and/or validate the BLOB and structural metadata. Materializing the BLOB data can involve loading the BLOB data into memory through an Input/Output (I/O) operation. The structural metadata can be used by computer software programs and application to fulfill one or more tasks.

If errors and/or null values were generated, the method proceeds to block 730, where an interface of the computing device can allow all or portions of the structural metadata associated with a BLOB byte array to be edited or moved within the BLOB byte array by the user. For example, the user can select a portion of structural metadata associated with one or more byte arrays for the BLOB to be moved within the byte array. In addition, the user can dynamically change one or more byte values in the BLOB or dynamically add/remove one or more fields from the structural metadata. The method 700 can then return to block 715 to determine whether the changes to the structural metadata that occurred in block 730 have fixed the errors and/or null value.

Accordingly, a system, a method, and/or computer program product disclosed herein can be used to analyze and edit structural metadata associated with binary large objects via an interactive platform. The system can be used to represent all or a portion of structural metadata and allow for the interactive movement of the structural metadata or portion thereof to any location within a BLOB. The system can also automatically convert the bytes for each field associated with the BLOB and display associated values in a format that is readable to the user.

The system can provide graphical visualization of the structural metadata, as well as BLOB data and field values associated with the structural metadata. The graphical visualization can be interactive thereby allowing the user to edit each field within a data structure, as well as an ability to view the effects of the editing action (i.e., did the changes fix the errors or null values associated with the converted field values?). The graphical visualization also allows the user to select a field or group of fields within the data structure, which can then be moved to a different location in the BLOB in order to obtain field values that do not cause errors or null values.

Accordingly, the disclosed system addresses drawbacks associated with conversions of BLOB mappings by an interactive interface which can be used to troubleshoot BLOB mappings without the delay of searching for individuals having the requisite skills to address errors or null values that arise during the conversion. The system described herein allows for a more efficient approach to visualize and troubleshoot the converted BLOB mapping when errors or null values are output for field values associated with the structural metadata.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for editing and correcting structural metadata associated a binary large object (BLOB), the method comprising:
    obtaining, using a processor, at least a portion of structural metadata associated with the BLOB;
    converting, using the processor, one or more fields associated with the at least a portion of structural metadata to a human readable value;
    determining, using the processor, that the one or more fields contain one or more errors or null values;
    moving at least a portion of the BLOB in response to the determination that the one or more fields contain one or more errors or null values;
    providing, using the processor, an interface, wherein the interface is used to cause a first movement or edit of the one or more fields;
    determining, using the interface, that the first movement or edit of the one or more fields fixes the one or more errors or null values; and
    providing, using the interface, an indication that the first movement or edit of the one or more fields has or has not fixed the one or more errors or null values,
    wherein moving at least a portion of the BLOB occurs at an increment of one or more bytes in a BLOB byte array.

2. The computer-implemented method of claim 1, further comprising causing a second movement or edit of the one or more fields in response to one or more errors or null values being generated after the first movement or edit.

3. The computer-implemented method of claim 1, further comprising materializing BLOB data or validating the BLOB and the at least a portion of structural metadata.

4. The computer-implemented method of claim 1, wherein the one or more errors or null values are created in response to the conversion failing to provide human readable values for the one or more fields.

5. A computer program product, the computer program product comprising a computer readable storage medium having program instructions embodied therewith, the program instructions readable by a processing circuit to cause the processing circuit to:
    obtain at least a portion of structural metadata associated with a binary large object (BLOB);
    convert one or more fields associated with the at least a portion of structural metadata to a human readable value;
    determine that the one or more fields contain one or more errors or null values;
    move at least a portion of the BLOB in response to the determination that the one or more fields contain one or more errors or null values;
    provide an interface, wherein the interface is used to cause a first movement or edit of the one or more fields;
    determine via the interface that the first movement or edit of the one or more fields fixes the one or more errors or null values; and
    provide an indication that the first movement or edit of the one or more fields has or has not fixed the one or more errors or null values via the interface,
    wherein moving at least a portion of the BLOB occurs at an increment of one or more bytes in a BLOB byte array.

6. The computer program product of claim 5, wherein the processing circuit is further operable to cause a second movement or edit of the one or more fields in response to one or more errors or null values being generated after the first movement or edit.

7. The computer program product of claim 5, wherein the one or more errors or null values are created in response to the conversion failing to provide human readable values for the one or more fields.

8. The computer program product of claim 5, wherein the processing circuit is further operable to materialize BLOB data or validate the BLOB and the at least a portion of structural metadata.

9. A computer system, comprising:
    a processor in communication with one or more types of memory, the processor configured to:
        obtain at least a portion of structural metadata associated with a binary large object (BLOB);
        convert one or more fields associated with the at least a portion of structural metadata to a human readable value;
        determine that the one or more fields contain one or more errors or null values;
        move at least a portion of the BLOB in response to the determination that the one or more fields contain one or more errors or null values;
        provide an interface, wherein the interface is used to cause a first movement or edit of the one or more fields;
        determine via the interface that the first movement or edit of the one or more fields fixes the one or more errors or null values; and
        provide an indication that the first movement or edit of the one or more fields has or has not fixed the one or more errors or null values via the interface,
        wherein moving at least a portion of the BLOB occurs at an increment of one or more bytes in a BLOB byte array.

10. The computer system of claim 9, wherein the processor is further operable to cause a second movement or edit of the one or more fields in response to one or more errors or null values being generated after the first movement or edit.

11. The computer system of claim 9, wherein the one or more errors or null values are created in response to the conversion failing to provide human readable values for the one or more fields.

12. The computer system of claim 9, wherein the processor is further operable to materialize BLOB data or validate the BLOB and the at least a portion of structural metadata.

* * * * *